(12) United States Patent
Patterson

(10) Patent No.: US 7,141,776 B2
(45) Date of Patent: Nov. 28, 2006

(54) INTEGRATED ROS BAR

(75) Inventor: James W. Patterson, Newark, NY (US)

(73) Assignee: Xerox Corporation, Stamford, CT (US)

( * ) Notice: Subject to any disclaimer, the term of this patent is extended or adjusted under 35 U.S.C. 154(b) by 10 days.

(21) Appl. No.: 11/094,961

(22) Filed: Mar. 31, 2005

(65) Prior Publication Data

US 2006/0219864 A1   Oct. 5, 2006

(51) Int. Cl.
  *H01L 27/00* (2006.01)
  *H04N 1/04* (2006.01)
(52) U.S. Cl. .................... 250/208.1; 358/474
(58) Field of Classification Search ............ 250/208.1; 358/296, 474, 482, 483
  See application file for complete search history.

(56) References Cited

U.S. PATENT DOCUMENTS

| | | | |
|---|---|---|---|
| 5,153,750 A | 10/1992 | Hiroi et al. | |
| 5,260,718 A | 11/1993 | Rommelmann et al. | |
| 5,526,141 A | 6/1996 | Ogura et al. | |
| 5,982,512 A | 11/1999 | Kim | |
| 6,015,200 A | 1/2000 | Ogura | |
| 6,417,508 B1 | 7/2002 | Ogura et al. | |
| 6,445,892 B1 * | 9/2002 | Kelsay | 399/94 |
| 6,469,808 B1 | 10/2002 | Onishi et al. | |
| 6,476,369 B1 | 11/2002 | Matsumoto | |
| 6,603,580 B1 * | 8/2003 | Taillie | 358/474 |

* cited by examiner

*Primary Examiner*—Stephone B. Allen
*Assistant Examiner*—Suezu Ellis
(74) *Attorney, Agent, or Firm*—Pillsbury Winthrop Shaw Pittman, LLP

(57) ABSTRACT

An integrated imaging bar assembly. The single-assembly scan and imaging head comprises two sub-assemblies, one having a raster input bar and the other a raster output bar including their respective lens array systems. Each sub-assembly has a heat sink attached to its respective bar and the sub-assemblies are conjoined at a heat shield that separates them from each other while forming a single integrated imaging bar assembly.

17 Claims, 3 Drawing Sheets

INTEGRATED ROS BAR

BACKGROUND

All references cited in this specification, and their references, are incorporated by reference herein where appropriate for teachings of additional or alternative details, features and/or technical background.

Disclosed is an integrated imaging assembly which incorporates a raster input device and a raster output device for use in electrophotographic imagery.

Electrophotographic and xerographic imaging devices may utilize raster technology for copying and/or printing functions separately in separate machines, or together in a complex or multifunction machines. In operation, an input raster captures either an image of a text document or a picture and transfers it into bits of information, which a computer can understand and manipulate. An output raster converts the bits of information into pixels which are then presented on a computer screen or printed on a document. Usually the raster devices are in the form of bars referenced as the raster input bar (RIB) and the raster output bar (ROB). For purposes of this specification, a RIB or ROB shall include any raster input or output device regardless of shape. RIBs and ROBs are separate components that reside in a copier or a printer, or in a copier/printer complex machine with their own sub-components, thus claiming their respective real estates, where space is at premium. It is described later in this disclosure an integrated imaging assembly which incorporates both functions into one assembly with the attendant reduced size and cost, and improved performance.

Single-assembly scan and imaging heads using moving electron or laser beams with their associated mirrors and imaging sensors, such as coupled capacitance devices (CCDs), or complementary metal-oxide semiconductor (CMOS) transistors, are known. However, an imaging bar using full width array (FWA) lenses, for example, can replace the various components including the mirrors and certain imaging sensors. An integrated imaging bar embodiment described later in this disclosure utilizes a full width array of SLA (Selfoc® Lens Array) lenses in a combined RIB and ROB assembly.

FIGS. 1a–1c show the use of SLA lenses especially suited for 1:1 image transfer applications in a copier 10, a scanner 20 and a printer 30, respectively. In FIG. 1a, a document 11 on a platen 12 is illuminated by a lamp 13 and the light 14 reflected from the document is collected by SLA 15 and directed onto a photoreceptor 17 where the latent image is then transferred onto a copy document 19 by means of electrophotographic techniques which are known. In scanner 20 shown in FIG. 1b, the lamp of FIG. 1a is replaced by light emitting diode (LED) arrays 23 which illuminate document 21. Light 24 reflected from the document is focused by means of a SLA system 25 onto image sensor array 27, which in turn convert light photons into electrons which in turn may be manipulated as electronic signals by a computer for further processing, such as displaying on a computer monitor or printing on a printer. FIG. 1d shows a printer 30 where electronic signals (not shown) are received from a computer at an LED array 33 which converts the signals to light rays 34 that are focused by means of SLA system 35 onto a photo sensitive drum 37 where a latent image is formed. The latent image is then transferred onto a document (not shown) through xerographic means, as described below.

It is desirable to combine the various functions described above into a single integrated imaging bar as disclosed below.

SUMMARY

Aspects disclosed herein include an apparatus comprising an input sub-assembly having an input top portion, an input bottom portion and an input surrounding enclosure; an input bottom member forming a closure of the input bottom portion of the input sub-assembly; a first imaging bar positioned over the input bottom member inside the input surrounding enclosure of the input sub-assembly; a first lens array system positioned over the first imaging bar and configured to fit inside the input top portion of the input sub-assembly; an intervening member having a first surface and a second surface, wherein the first surface is disposed in contact with the input bottom member of the input sub-assembly; an output sub-assembly having an output top portion, an output bottom portion and an output surrounding enclosure; an output bottom member forming a closure of the output bottom portion of the output sub-assembly, wherein the output bottom member of the output sub-assembly is disposed in contact with the second surface of the intervening member; a second imaging bar positioned over the output bottom member inside the output surrounding enclosure of the output sub-assembly; a second lens array system positioned over the second imaging bar and configured to fit inside the output top portion of the output sub-assembly; wherein the first imaging sub-assembly and the second imaging sub-assembly together form an integrated imaging bar assembly in cooperation with and separated from each other through the intervening member. The intervening member comprises a heat shield; and an apparatus comprising an electrophotographic first imaging sub-assembly; an intervening member having a first surface and a second surface, wherein the first imaging sub-assembly is disposed over the first surface of the intervening member; and an electrophotographic second imaging sub-assembly disposed over the second surface of the intervening member; wherein the first imaging sub-assembly and the second imaging sub-assembly together form an integrated imaging bar assembly in cooperation with and separated from each other by the intervening member. The intervening member comprises a heat shield.

DETAILED DESCRIPTION

In embodiments there is illustrated:

an integrated imaging bar assembly which incorporates a raster input bar (RIB) and a raster output bar (ROB) for use in electrophotographic imagery.

Figure 1A:
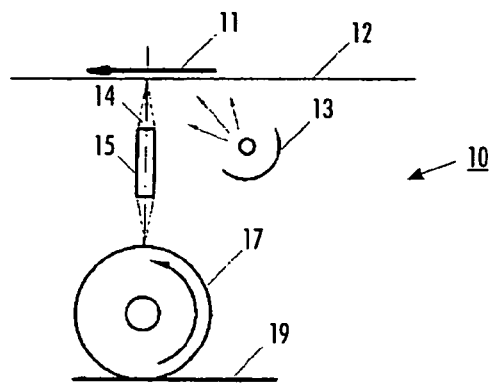
FIGS. 1a, 1b and 1c are drawings showing the various uses of SLA lens in a copier, scanner and printer machine, respectively.
Figure 1B:
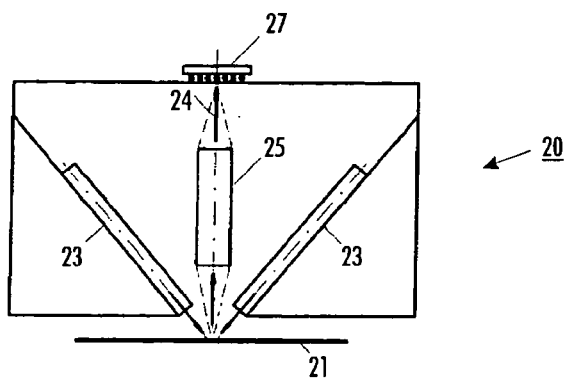
Figure 1C:
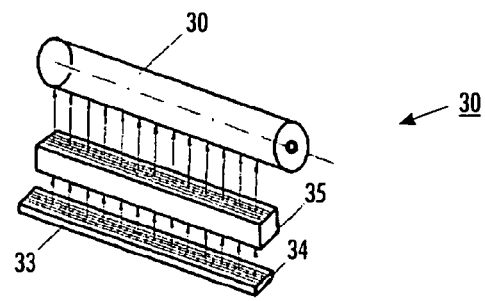
Figure 2:
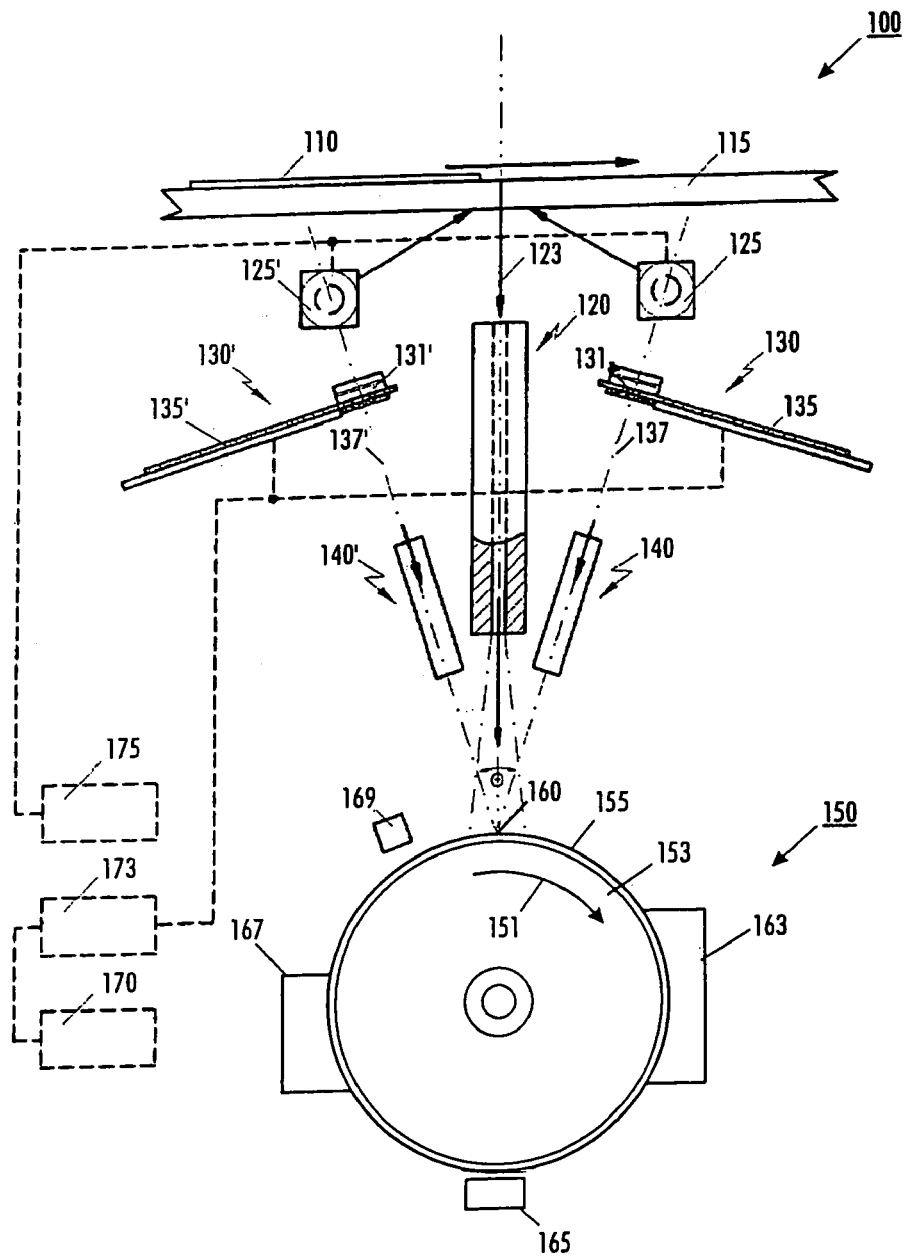
FIG. 2 is a drawing showing an imaging system for an electrophotographic printer using separate imaging bars.

A commonly used single imaging bar assembly in an electrophotographic copier/printer combination is described in U.S. Pat. No. 5,260,718 as shown in FIG. 2. The multi-function machine 100 shown in the Figure incorporates a raster input imaging bar (RIB) 120 with raster output imaging bars (ROBs) 130 and 130'. Copying function is provided by the RIB system 120, while the printing function is provided by ROB systems 130 and 130' comprising imaging bar assemblies 135 and 135', which may include shutter image systems 131 and 131' under control of a controller (not shown) and their associated lens system 140 and 140'. In either the copying or printing mode, the final output may be printed on a printer 150 as shown in FIG. 2.

In copying mode, a document 110 is transported across the surface of platen 115 by a commonly used continuous velocity transport means (not shown). The document is incrementally illuminated by illumination from one or more light sources, such as a plurality of light sources, shown for simplification as a pair of light sources 125 and 125' energized by power supply 175. Light sources may comprise mercury lamps, fluorescent lamps, LEDs or a light source and a reflector. Light is reflected downward 123 and is imaged by Selfoc™ lens array (SLA) 120 onto a photoreceptor 155 (FIG. 2) on the surface of drum 153 creating a line by line exposure of the document and forming a latent image. As is known, printer 150 includes a series of process stations through which the photoreceptor drum 153 passes beginning with the imaging station 160 where the latent electrostatic image is formed. Drum 153 moves past development station 163, transfer station 165 where the image is transferred to paper and fused, to cleaning station 167, and to corona charging station 169 where the photoreceptor is charged.

When print mode is selected, imaging systems 130 and 130' are enabled and subsequently controlled by signals from a systems controller 170. Imaging systems 130 and 130' comprise bar assemblies 135 and 135' and associated Selfoc™ lens array (LSA) 140 and 140', which are optically aligned along center line 137 and 137', respectively. The two sets of components aligned along center lines 137 and 137' form an angle θ and are sufficiently displaced from each other in their process direction to accommodate the copier imaging system 120 as shown in FIG. 2.

Light sources 125 and 125' illuminate assemblies 135 and 135', respectively. Bar assemblies 135 and 135' shown in FIG. 2 comprise liquid crystal type imaging bars although other types of imaging bars may also be used, such as LED imaging bars addressed by appropriate control means. Each imaging bar has two offset rows of linear liquid crystal pixels. The transmissive state of each imaging bar is determined by selective application of a voltage to a plurality of electrodes on the imaging bar substrate. Bar control circuit 173 energizes the appropriate electrodes in response to digitized bit-mapped data input representing document information typically sent from a charge coupled device or from a computer and stored in controller memory. Bar control circuitry 173 is described in U.S. Pat. No. 5,207,718, which is incorporated herein by reference in its entirety, and will not be discussed any further here in order not to unnecessarily obscure the significant aspects of the present disclosure.

Figure 3:
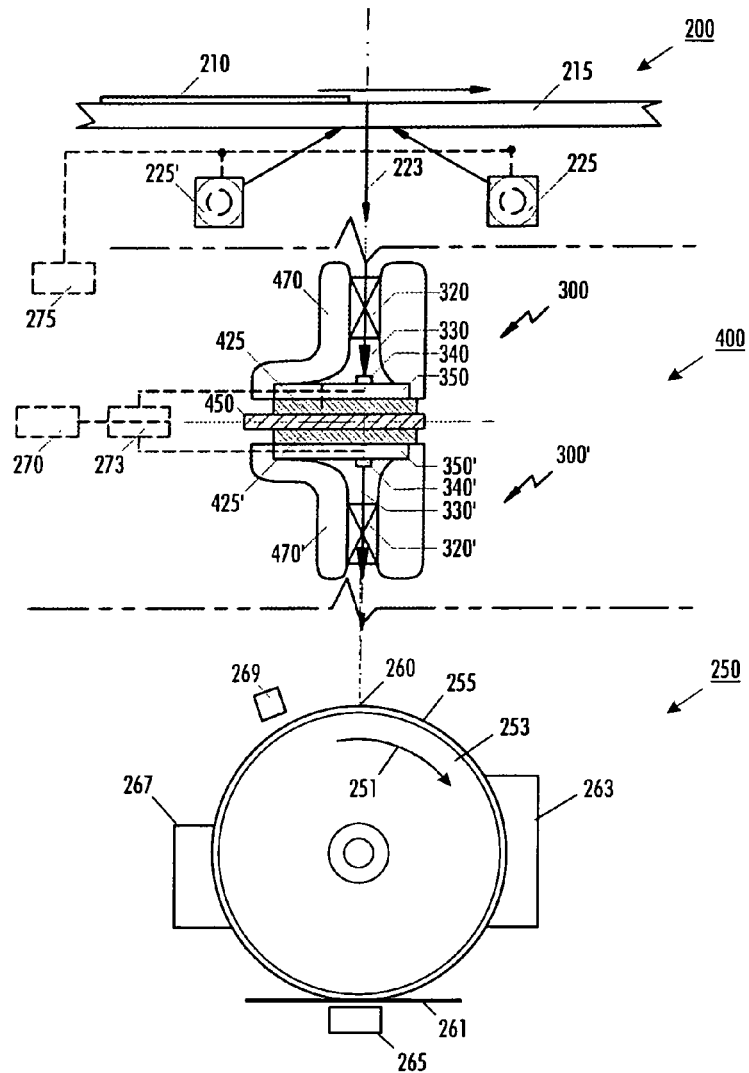
FIG. 3 is a drawing of an embodiment showing the replacement of the separate imaging bars of FIG. 2 with a single integrated imaging bar assembly.

An embodiment of the present disclosure is shown in FIG. 3 where imaging bar sub-assemblies 300 and 300' are further integrated into a single multi-function head assembly 400. It will be noted in FIG. 3 that the electrophotographic arrangement shown is similar to that of FIG. 2 except for the separate imaging components 120, 130, 130', 140 and 140' of FIG. 2 are now consolidated in and replaced by the sub-assemblies 300 and 300' of the present disclosure. As in the case of the process flow shown in FIG. 2, in copying mode, a document 210 of system 200 shown in FIG. 3 is transported across the surface of platen 215. The document is incrementally illuminated by illumination from a pair of light sources 225 and 225' energized by power supply 275. Light is reflected downward 223 and is imaged by a lens system in sub-assembly 300 as described further below. When print mode is selected, sub-assembly 300' is enabled under the command of systems controller 270. Printing is accomplished by directing light signals emanating from sub-assembly 300' to photoreceptor 255 creating a line by line exposure of the document and forming a latent image. Drum 253 moves past development station 263, transfer station 265 where the image is transferred to a sheet 261 and fused, to cleaning station 267, and to corona charging station 269 where the photoreceptor is charged to start the next imaging process.

In one aspect, sub-assembly 300 performs the function of inputting reflected light 223 received from document 210 into a raster input bar (RIB) 350. The reflected light 223 is first received by a lens system 320 and then directed 330 onto photosensors 340 formed in RIB 350. The lens system may comprise, but not limited to Selfoc™ lens array (SLA-9) having 9 arrays, manufactured by Nippon Sheet Glass Company. Photo sensors 340, such as CCDs or CMOS devices convert light photons into electron electronic signals which are manipulated by system control 273 in the form of digital data. In another aspect, on the other hand, sub-assembly 300' performs the function of outputting digital information received from system control 273 after converting the electronic data into light signals 330' derived from light emitting devices 340' formed in a raster output bar (ROB) 350'. SLA-20B lens system 320' projects light rays 330' emanating from the ROB onto drum 253 to expose photoreceptor 255 followed by the affixing of the image onto a sheet 261.

In another embodiment shown in FIG. 3, the sub-assemblies 300 and 300' forming the integrated single multi-function imaging head 400 are separated by a heat shield 450. It will be appreciated by those skilled in the art that imaging bars are temperature sensitive and therefore require heat shielding from heat generating components within adjacent sub-assemblies themselves. The raster input bar (RIB) 350 and raster output bar (ROB) 350' include heat generating electronic circuitry which drive the photosensors 340 and light emitting devices 340' in their respective imaging bars. In order to dissipate the heat efficiently, the RIB and the ROB are fitted with heat sinks 425 and 425', respectively. The heat dissipating surfaces, such as fins, of the heat sink may be configured in any shape that will accommodate efficient heat removal from the imaging bars. Heat sinks 425 and 425' may comprise high thermal conductivity materials including, but not limited to, aluminum or ceramic. Heat shield 450 may comprise materials such as stainless steel to minimize heat transfer from one sub-assembly to another.

As shown in FIG. 3, sub-assemblies 300 and 300' are partially enclosed in their respective covers 470 and 470' with a corresponding opening to allow light 330 to enter or leave 330' their respective imaging bars 350 and 350'. Heat sinks 425 and 425' form the closure of the remaining side of covers 470 and 470', as shown in FIG. 3. Heat sinks 425 and 425' form intimate contact with heat shield 450, thus making their respective sub-assemblies conjoin to form a single integrated imaging bar assembly having a smaller size than is currently possible with separate raster bars.

It will be appreciated that variations of the above-disclosed embodiments and other features and functions, or alternatives thereof, may be desirably combined into many other different devices or applications. Also that various presently unforeseen or unanticipated alternatives, modifications, variations or improvements therein may be subsequently made by those skilled in the art which are also intended to be encompassed by the following claims.

What is claimed is:

1. An assembly comprising:
   a lens sub-assembly;
   a raster input sub-assembly;
   a raster output sub-assembly operationally associated with said raster input sub-assembly and said lens sub-assembly;
   a heat barrier between said raster input sub-assembly and said raster output sub-assembly; and
   a heat sink operationally associated with said heat barrier.

2. An apparatus comprising:
   a first imaging sub-assembly configured to convert light reflected from a document into digital signals representative of an image of the document, the first imaging sub-assembly including an input lens array, a raster input bar (RIB) and a heat sink attached to said RIB;
   a second imaging sub-assembly configured to convert the digital signals into light signals corresponding to an image of the document;
   an intervening member having a first surface and a second surface, wherein said first imaging sub-assembly is disposed over said first surface of said intervening member; and said second imaging sub-assembly is disposed over said second surface of said intervening member.

3. The apparatus of claim 2, wherein said second imaging sub-assembly includes an output lens array, a raster output bar (ROB) and a heat sink attached to said ROB.

4. The apparatus of claim 2, wherein said intervening member comprises a heat shield.

5. The apparatus of claim 4, wherein said heat shield comprises stainless steel.

6. An apparatus comprising;
   an input sub-assembly housing having an input top portion, an input bottom portion and an input surrounding enclosure;
   a first imaging bar positioned over said input bottom portion inside said input surrounding enclosure of said input sub-assembly housing;
   a first lens array system positioned over said first imaging bar and operationally associated therewith, said first lens array system being configured to fit inside said input top portion of said input sub-assembly housing;
   an intervening member having a first surface and a second surface, wherein said first surface is disposed in contact with said input bottom portion of said input sub-assembly housing;
   an output sub-assembly housing having an output top portion, an output bottom portion and an output surrounding enclosure wherein said output bottom portion of said output sub-assembly is disposed in contact with said second surface of said intervening member;
   a second imaging bar positioned over said output bottom portion inside said output surrounding enclosure of said output sub-assembly housing;
   a second lens array system positioned over said second imaging bar and operationally associated therewith, said second array system being configured to fit inside said output top portion of said output sub-assembly housing;
   wherein said first imaging sub-assembly and said second imaging sub-assembly together form an integrated imaging bar assembly in cooperation with and separated from each other through said intervening member.

7. The apparatus of claim 6, wherein said input top portion comprises an opening to allow light rays to enter into said input sub-assembly housing.

8. The apparatus of claim 6, wherein said input bottom portion comprises a first heat sink.

9. The apparatus of claim 6, wherein said first imaging bar comprises a raster input bar (RIB).

10. The apparatus of claim 9, wherein said RIB comprises a printed circuit board having charge coupled devices (CCDs).

11. The apparatus of claim 9, wherein said RIB comprises printed circuit board having CMOS chips.

12. The apparatus of claim 6, wherein said intervening member comprises a heat shield.

13. The apparatus of claim 12, wherein said heat shield comprises stainless steel.

14. The apparatus of claim 6, wherein said output bottom portion comprises a second heat sink.

15. The apparatus of claim 6, wherein said second imaging bar comprises a raster output bar (ROB).

16. The apparatus of claim 15, wherein said ROB comprises a printed circuit board.

17. The apparatus of claim 16, wherein said printed circuit board ha includes light emitting devices (LEDs).

* * * * *